United States Patent
Furuzawa et al.

(10) Patent No.: US 7,808,773 B2
(45) Date of Patent: Oct. 5, 2010

(54) ELECTRONIC PART AND PROCESS FOR PRODUCING THE SAME

(75) Inventors: Atsushi Furuzawa, Habikino (JP); Kohei Goto, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 515 days.

(21) Appl. No.: 11/815,529

(22) PCT Filed: Jan. 30, 2006

(86) PCT No.: PCT/JP2006/301421

§ 371 (c)(1),
(2), (4) Date: Aug. 3, 2007

(87) PCT Pub. No.: WO2006/082772

PCT Pub. Date: Aug. 10, 2006

(65) Prior Publication Data

US 2009/0009930 A1   Jan. 8, 2009

(30) Foreign Application Priority Data

Feb. 4, 2005   (JP)   ............................. 2005-028925

(51) Int. Cl.
*H01G 4/228* (2006.01)
(52) U.S. Cl. ................. 361/540; 361/523; 361/525; 361/516; 361/528; 361/529
(58) Field of Classification Search ........... 361/523, 361/516–519, 525, 528–529, 540–541, 508, 361/509; 29/25.01, 25.03
See application file for complete search history.

(56) References Cited

U.S. PATENT DOCUMENTS

| | | | | |
|---|---|---|---|---|
| 6,671,167 B2 * | 12/2003 | Araki et al. | ................. | 361/523 |
| 6,751,086 B2 * | 6/2004 | Matsumoto | ................. | 361/523 |
| 6,785,124 B2 * | 8/2004 | Nakamura et al. | .......... | 361/533 |
| 6,850,406 B2 * | 2/2005 | Asami et al. | ................. | 361/528 |
| 6,903,922 B2 * | 6/2005 | Sano et al. | ................. | 361/533 |
| 6,965,508 B2 * | 11/2005 | Takatani et al. | ............. | 361/523 |

(Continued)

FOREIGN PATENT DOCUMENTS

JP   58-112321 A   7/1983

(Continued)

OTHER PUBLICATIONS

International Search Report of PCT/JP2006/301421, date of mailing Apr. 18, 2006.

(Continued)

*Primary Examiner*—Nguyen T Ha
(74) *Attorney, Agent, or Firm*—Westerman, Hattori, Daniels & Adrian, LLP

(57) ABSTRACT

To provide electronic parts having a platy terminal secured through a conductive adhesive layer onto a device, which electronic parts are low in ESR and excel in the bonding strength between device and terminal. The conductive adhesive contains a flat conductive member and an organic solvent and is characterized in that through vaporization of the organic solvent in vacuum atmosphere, the flat conductive member has a region standing in the direction of thickness of the conductive adhesive layer. Further, the conductive adhesive is characterized by containing portion wherein the angle between the platy terminal and the flat plane of conductive member is $\geq 45°$.

8 Claims, 3 Drawing Sheets

U.S. PATENT DOCUMENTS

| | | | |
|---|---|---|---|
| 7,027,291 B2 * | 4/2006 | Horio et al. | 361/523 |
| 2003/0081374 A1 | 5/2003 | Takada | |

FOREIGN PATENT DOCUMENTS

| | | |
|---|---|---|
| JP | 6-151521 A | 5/1994 |
| JP | 10-64761 A | 3/1998 |
| JP | 11-297757 A | 10/1999 |
| JP | 2001-57321 A | 2/2001 |
| JP | 2001-85466 A | 3/2001 |
| JP | 2001-148326 A | 5/2001 |
| JP | 2003-45228 A | 2/2003 |
| JP | 2003-197468 A | 7/2003 |
| JP | 2005-101480 A | 4/2005 |

OTHER PUBLICATIONS

Japanese Office Action dated Sep. 29, 2009, issued in corresponding Japanese Patent Application No. 2007-501553.

* cited by examiner

ELECTRONIC PART AND PROCESS FOR PRODUCING THE SAME

TECHNICAL FIELD

The present invention relates to an electronic part comprising a terminal, and more specifically, it relates to a solid electrolytic capacitor.

BACKGROUND ART

In relation a solid electrolytic capacitor (1), a structure shown in FIG. 1 is known in general. In this structure, a dielectric film (4) is formed on the peripheral surface of an anode body (3) prepared from a sintered body of a valve metal, and a cathode layer (5) is formed on this dielectric film (4). Cathode layer (5) includes a solid electrolytic layer, a carbon layer and a silver paste layer. An anode lead member (3a) is drawn out from a surface of anode body (3), and mounted on an anode terminal (20) by resistance welding. A cathode terminal (30) is mounted on cathode layer (5) with a conductive adhesive (10). A capacitor device (2) is sealed with a housing (7), while anode terminal (20) and cathode terminal (30) protrude from housing (7), and are bent along the peripheral surface of this housing (7). Housing (7) is formed by introducing capacitor device (2) mounted with the terminals into a metal mold and injection-molding synthetic resin such as epoxy resin, as is well known (Patent Document 1, for example).

A valve metal denotes a metal forming an extremely dense dielectric film having durability by electrolytic oxidation, and tantalum, niobium, aluminum titanium etc. correspond thereto. The solid electrolyte can be prepared from a conductive inorganic material such as manganese dioxide or a conductive organic material such as TCNQ complex salt or a polypyrrole-based, polythiophene-based or polyaniline-based conductive polymer.

Anode lead member (3a) is mounted on anode terminal (20) by resistance welding with high bonding strength. On the other hand, cathode terminal (30) is mounted on capacitor device (2) with conductive adhesive (10), since cathode layer (5) may be held between electrodes for resistance welding and damaged if the former is mounted on the latter by resistance welding. Cathode terminal (5) is formed by a platy one, in order to provide a wide contact area with capacitor device (2).

The applicant has once proposed a technique of improving bonding strength between a device and a terminal in an electronic part formed by mounting the terminal on the device with a conductive adhesive by forming an adhesive filling portion on a surface of the terminal opposed to the device and filling up the adhesive fling portion with the conductive adhesive (Patent Document 2, for example).

Patent Document 1: Japanese Patent Laying-Open No. 10-64761

Patent Document 2: Japanese Patent Application No. 2003-379231

DISCLOSURE OF THE INVENTION

Problems to be Solved by the Invention

The conductive adhesive employed for the aforementioned electronic part such as a solid electrolytic capacitor is prepared by mixing a conductive member of silver powder or the like, an epoxy-based or phenol-based hardener and an organic solvent such as dibasic acid ester, ethyl carbitol or butyl carbitol with each other. While the conductive adhesive is dried and hardened by heat treatment, there has been such a problem in this method that the concentration of the conductive member in the conductive adhesive is so low that ESR (equivalent series resistance) is not reduced due to a large quantity of organic solvent remaining therein.

Accordingly, the present invention provides an electronic part having low ESR and exhibiting excellent bonding strength between a device and a terminal and a process for producing the same in consideration of the aforementioned problem.

Means for Solving the Problems

In order to solve the aforementioned problem, the electronic part according to the present invention is characterized in that, in an electronic part produced by mounting a platy terminal on a device through a conductive adhesive layer, the said conductive adhesive contains a flat conductive member, and the said flat conductive member has a region standing in the direction of thickness of the said conductive adhesive layer.

Further, the electronic part according to the present invention is characterized in that, in an electronic part produced by mounting a platy terminal on a device through a conductive adhesive layer, the said conductive adhesive contains a flat conductive member and an organic solvent, and the said organic solvent is so vaporized in a vacuum atmosphere that the said flat conductive member stands in the direction of thickness of the said conductive adhesive layer.

In addition, the electronic part according to the present invention is characterized in that, in an electronic part produced by mounting a platy terminal on a device through a conductive adhesive layer, the said conductive adhesive contains a flat conductive member, and includes a portion where the angle formed by the said platy terminal and the flat plane of the conductive member is at least 45°.

According to the present invention, contact resistance between flat conductive members can be reduced in the conductive adhesive layer, and ESR of the electronic part can be reduced.

The process for producing an electronic part according to the present invention is characterized in that, in a process for producing an electronic part including the step of connecting a platy terminal to a device with a conductive adhesive containing an organic solvent and a conductive member, the organic solvent contained in the said conductive adhesive is vaporized by heating the device mounted with the platy terminal in a vacuum atmosphere in the said step.

The process according to the present invention is so employed that vaporization of the organic solvent contained in the conductive adhesive layer is prompted, the density of the conductive member in the said conductive adhesive layer can be improved, and ESR of the electronic part can be reduced.

Further, the process for producing an electronic part according to the present invention is characterized in that the said platy terminal connected to the device with the conductive adhesive applies pressure toward the conductive adhesive side with a pressing section in the said vacuum atmosphere.

The aforementioned process is so employed that the conductive adhesive layer can be inhibited from formation of voids through vaporization of the organic solvent, and can be prevented from increase in thickness. Thus, the electronic part can be miniaturized and prevented from development of a defective appearance.

Effects of the Invention

According to the present invention, contact resistance between flat conductive members can be reduced in the conductive adhesive layer, and ESR of the electronic part can be reduced.

BEST MODES FOR CARRYING OUT THE INVENTION

The present invention can be applied to an electronic part such as a capacitor or an IC. A conductive adhesive prepared by mixing a flat conductive member of a metal such as gold, silver, copper or palladium and an organic solvent such as dibasic acid ester, ethyl carbitol or butyl carbitol with each other can be employed as the conductive adhesive employed in the present invention. An epoxy-based or phenol-based hardener may be added thereto.

The term "flat" used in relation to the present invention denotes a discoidal, flaky or laminar shape, in which the ratio (flattening=L/d) between the maximum value (major axis L) and the minimum value (minor axis d) of the outer diameter of particles is at least about 2.

The electronic part according to the present invention is formed by mounting a device performing the function of each part and a platy terminal for connecting the part with an internal or external circuit on each other with a conductive adhesive.

In the electronic part according to the present invention, the flat conductive member includes a region standing in the direction of thickness of the conductive adhesive layer in the conductive adhesive layer. In relation to the present invention, "standing" denotes a state inclined in the thickness direction (Z direction) of the conductive adhesive layer, as shown in FIG. 3. This can be clearly distinguished from such a state that flat conductive members are stacked with each other in a sinking manner in a conductive adhesive layer as in a conventional electronic part shown in FIG. 5.

As a method of making the conductive adhesive stand in the conductive adhesive layer, the said organic solvent is vaporized in a vacuum atmosphere in the step of mounting the platy terminal on the device with the conductive adhesive. Thus, the direction of the conductive member in the conductive adhesive can be changed when the organic solvent is vaporized, so that the conductive member is inclined in the thickness direction in the conductive adhesive layer.

Thus, the path of a current in the thickness direction (Z direction) in the conductive adhesive layer is improved. Further, the residue of the organic solvent having low conductivity can be reduced, and the ratio of the conductive member in the conductive adhesive layer is so increased that the ESR can be reduced.

The step of mounting the platy terminal on the device with the conductive adhesive is preferably carried out in a vacuum state by heating the device. Thus, vaporization of the organic solvent is prompted, and the ESR of the electronic part can be further reduced. When the said conductive adhesive contains a hardener of epoxy resin or the like, the device is so heated in a vacuum atmosphere that the hardener is shrunk and the density of the conductive member in the conductive adhesive layer can be further improved. Thus, not only the ESR of the electronic part can be reduced but also the bonding strength between the device and the platy terminal can be improved.

In relation to the present invention, the term "vacuum" denotes the state of a vacuum pressure of not more than 500 Pa. While the heating in the step of mounting the platy terminal on the device with the conductive adhesive is not particularly restricted, there is a method increasing the temperature to a level of at least 100° C. at a burst or a method increasing the temperature from a medium temperature region of 20 to 70° C. and maintaining a level of 150 to 180° C. for several hours. The applicant has confirmed that vaporization of an organic solvent is more prompted when the latter method is employed, as compared with the former method.

As an embodiment of the present invention, experiments have been conducted with reference to solid electrolytic capacitors employed as exemplary electronic parts.

EXPERIMENT 1

Confirmation of Effect of Vacuum Treatment

Example 1

FIG. 1 is a sectional view of a solid electrolytic capacitor (1) according to the present invention. A method of producing a capacitor device (2) is identical to a conventional one, such that a dielectric film (4) and a cathode layer (5) are successively formed on the peripheral surface of an anode body (3). A solid electrolytic layer of polypyrrole, a carbon layer and a silver paste layer were successively formed as cathode layer (5). Thereafter a conductive adhesive prepared by mixing a conductive member of laminar silver powder, a hardener of epoxy resin and an organic solvent of dibasic acid ester with each other is applied onto a cathode terminal (30) bent in a stepped manner with a thickness of about 0.2 mm, and capacitor device (2) is so placed that an anode lead member (3a) and cathode layer (5) come into contact with an anode terminal (20) and cathode terminal (30) respectively. Thereafter anode terminal (20) is connected to anode lead member (3a) by resistance welding.

Then, capacitor device (2) is introduced into a vacuum apparatus (not shown) as vacuum treatment before the conductive adhesive is hardened, and heat-treated in a vacuum atmosphere. The degree of vacuum was set to not more than 500 Pa, and the temperature was increased from 65° C. up to 160° C. and held for 1 hour so that the organic solvent contained in the conductive adhesive was easily vaporized. At this time, a conductive adhesive layer (10) was hardened while regularly maintaining an evacuative state.

Thereafter the said capacitor device (2) is covered/sealed with a housing (7) of epoxy resin. Anode terminal (20) and cathode terminal (30) were protruded from housing (7), and bent along the peripheral surface of housing (7) for completing solid electrolytic capacitor (1).

Comparative Example 1

A capacitor device (2) was placed on an anode terminal (20) and a cathode terminal (30) similarly to Example 1, and anode terminal (20) was connected to an anode lead member (3a). Thereafter the said conductive adhesive was hardened by a conventional method applying heat treatment of at least 100° C. without introduction into a vacuum apparatus before hardening of the conductive adhesive. Thereafter a solid electrolytic capacitor was completed similarly to Example 1.

100 samples were prepared for each of Example 1 and comparative example 1, for measuring ESR. FIG. 2 shows the results. The measurement of ESR was performed with an LCR meter (reactance•capacitance•resistance measuring apparatus) at 100 KHz.

As understood from FIG. 2, it was possible to reduce the ESR in Example 1 by about 20% as compared with comparative example 1 employing the conventional method. This is conceivably because vaporization of the organic solvent contained in the conductive adhesive was prompted due to the vacuum state in the step of mounting the platy terminal on the device with the conductive adhesive to improve the density of the conductive member in conductive adhesive layer (10).

When conductive adhesive layers (10) according to Example 1 and comparative example 1 were confirmed with an SEM (scanning electron microscope), laminar silver particles (11) were arranged to overlap with each other in an XY direction on the surface of cathode layer (5) in comparative example 1, as shown in FIG. 5. In Example 1, on the other hand, the said laminar silver particles (11) were hardened in a standing state, more specifically in a state inclined at random in the thickness direction in the conductive adhesive layer due to vaporization of the organic solvent, as shown in FIG. 3. In conductive adhesive layer (10) of comparative example 1, it was not possible to confirm that in which the angle formed by the platy terminal and flat planes of the laminar silver particles was at least 45°. On the other hand, conductive adhesive layer (10) of Example 1 had a plurality of portions where the angle formed by the platy terminal and flat planes of the laminar silver particles was at least 45°, also along with portions where the angle formed by the platy terminal and the flat planes of the laminar silver particles was substantially orthogonal.

Thus, it is conceivable that the path of a current in the thickness direction (Z direction) in the conductive adhesive layer was improved, resistance in the Z direction could be reduced, and the ESR of the solid electrolytic capacitor could be reduced.

EXPERIMENT 2

Confirmation of Effect of Pressing Section

Example 2

A solid electrolytic capacitor was prepared by a method similar to that in Example 1 except that a conductive adhesive (10) was hardened while maintaining such a state that a cathode terminal (30) connected to a capacitor device (2) with the conductive adhesive applied a pressure toward the conductive adhesive with a pressing section (55) in a vacuum treatment step, as shown in FIG. 4.

20 capacitors were prepared for each of Examples 1 and 2, and average values of the thicknesses of conductive adhesives and ESR were obtained. Table 1 shows the results.

TABLE 1

|  | Thickness (mm) | ESR (mΩ) |
| --- | --- | --- |
| Example 1 | 0.67 | 9.6 |
| Example 2 | 0.07 | 9.5 |

As understood from the above Table 1, the thickness of conductive adhesive layer (10) was increased to at least three times in Example 1 not applying a pressure with pressing section (55), although the thickness in application was 0.2 mm. This is conceivably because a large number of voids were formed therein as a result of prompting vaporization of the organic solvent. In Example 2 applying the pressure with pressing section (55), on the other hand, the thickness of conductive adhesive layer (10) was reduced to about ⅓ of that in application, and it was possible to attain a small effect of reducing the ESR. This is conceivably because the pressure of pressing section (55) prevents conductive adhesive layer (10) from increase of the thickness and assists the organic solvent in escaping outward from the side surfaces of the terminals. Thus, it is possible to prevent such a defective appearance that cathode terminal (30) is exposed from housing (7), and to contribute to miniaturization of the finished capacitor.

While the thickness of the conductive adhesive layer in the conventional electronic part exceeds 0.2 mm in a hardened state even if no vacuum treatment is performed, a thin conductive adhesive layer of 0.01 to 0.1 mm can be formed by employing the method of Example 2 according to the present invention. Thus, the intervals between the device and the terminals can be reduced, the electronic part can be miniaturized and can be prevented from development of a defective appearance.

Further laminar silver particles (11) forming the conductive member in the conductive adhesive layer maintain a standing state to some extent despite the pressure received from the pressing section. Therefore, the density of the conductive member in the conductive adhesive layer remains in a high state, and an excellent conductive adhesive layer having low resistance and a small thickness can be formed.

While the above Examples have been described with reference to solid electrolytic capacitors, a similar effect can be attained also in another electronic part such as an IC, for example.

Figure 1:
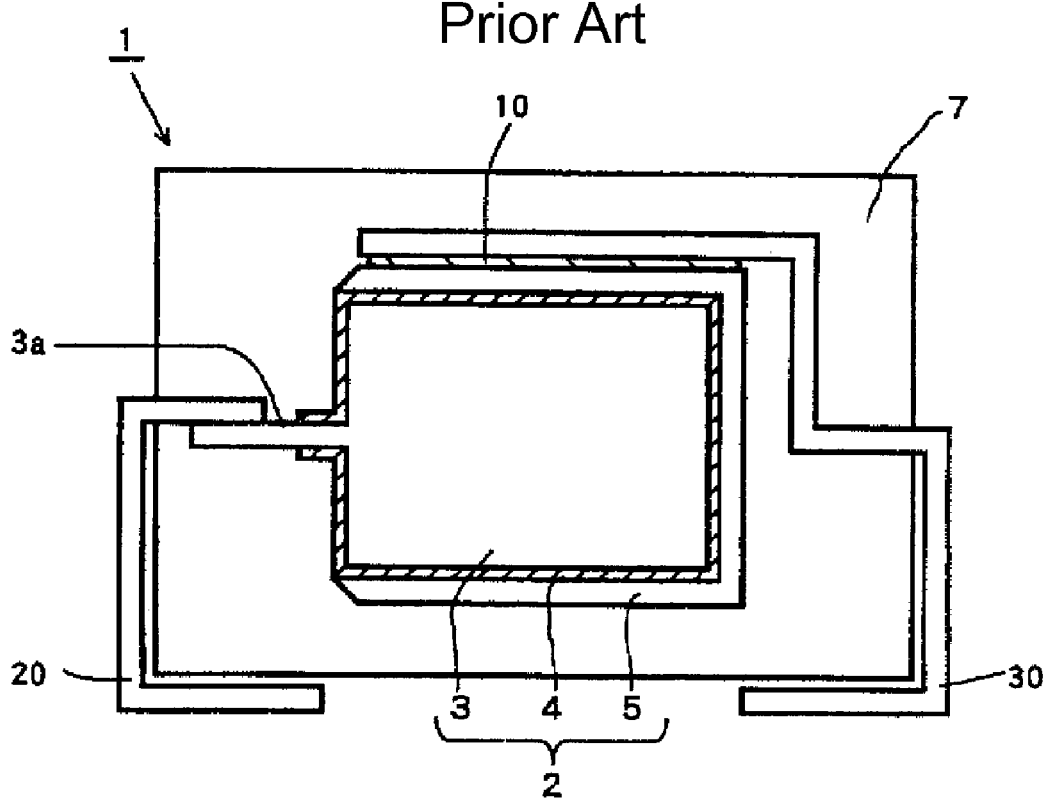
FIG. 1 is a sectional view of a solid electrolytic capacitor according to each of the present invention and the prior art.
Figure 2:
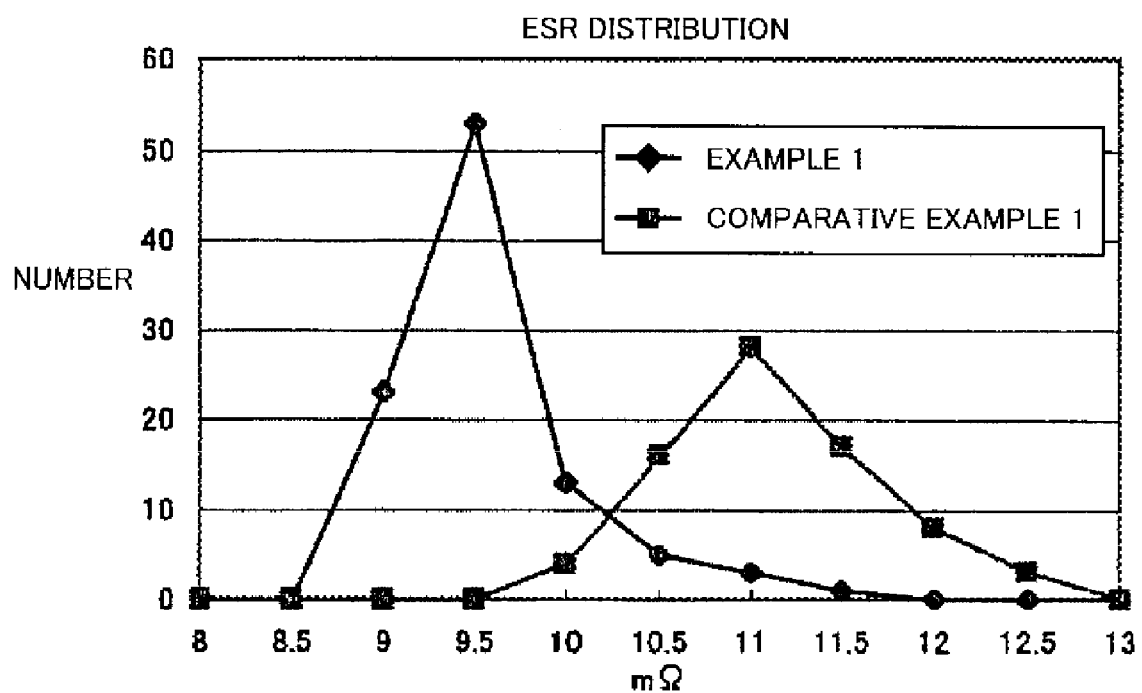
FIG. 2 is a distribution diagram of ESR values showing the results of Experiment 1.
Figure 3:
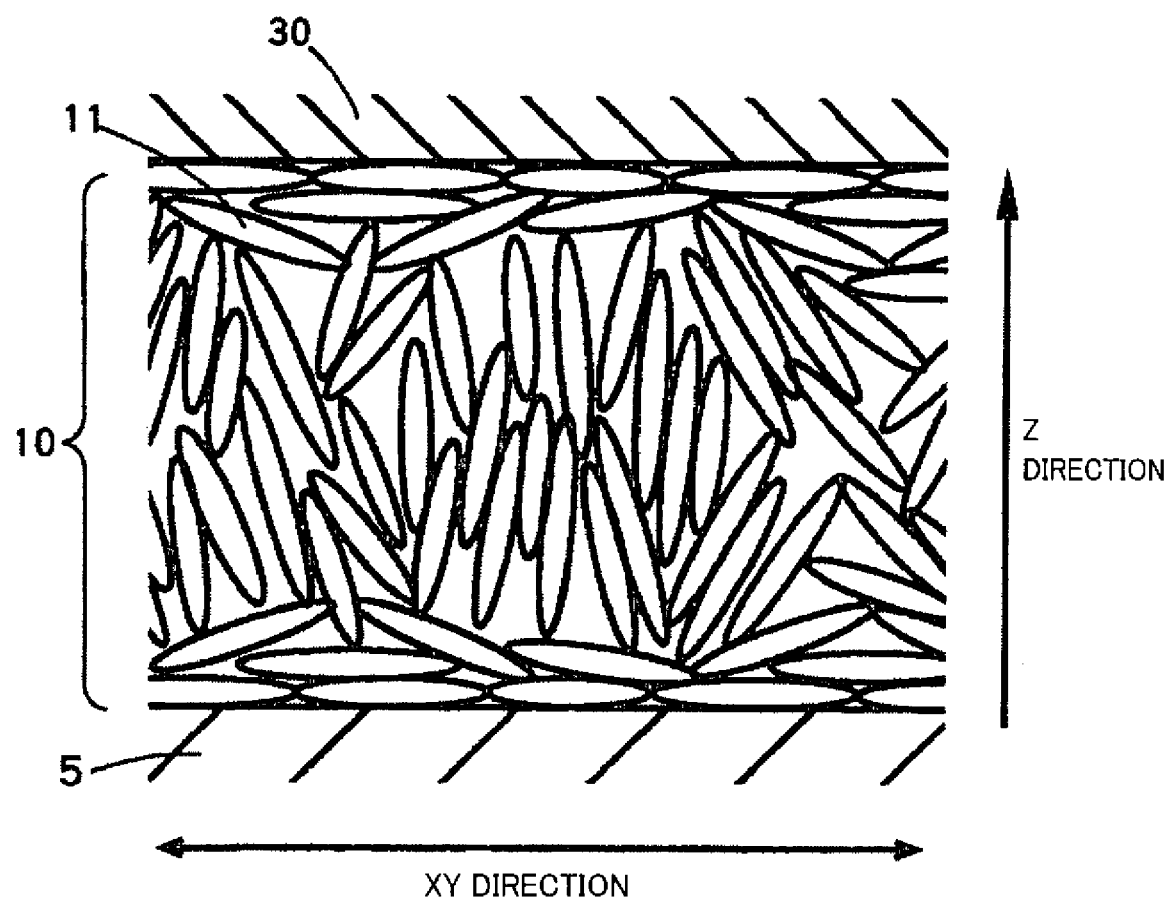
FIG. 3 is a sectional view of a conductive adhesive layer in the present invention.
Figure 4:
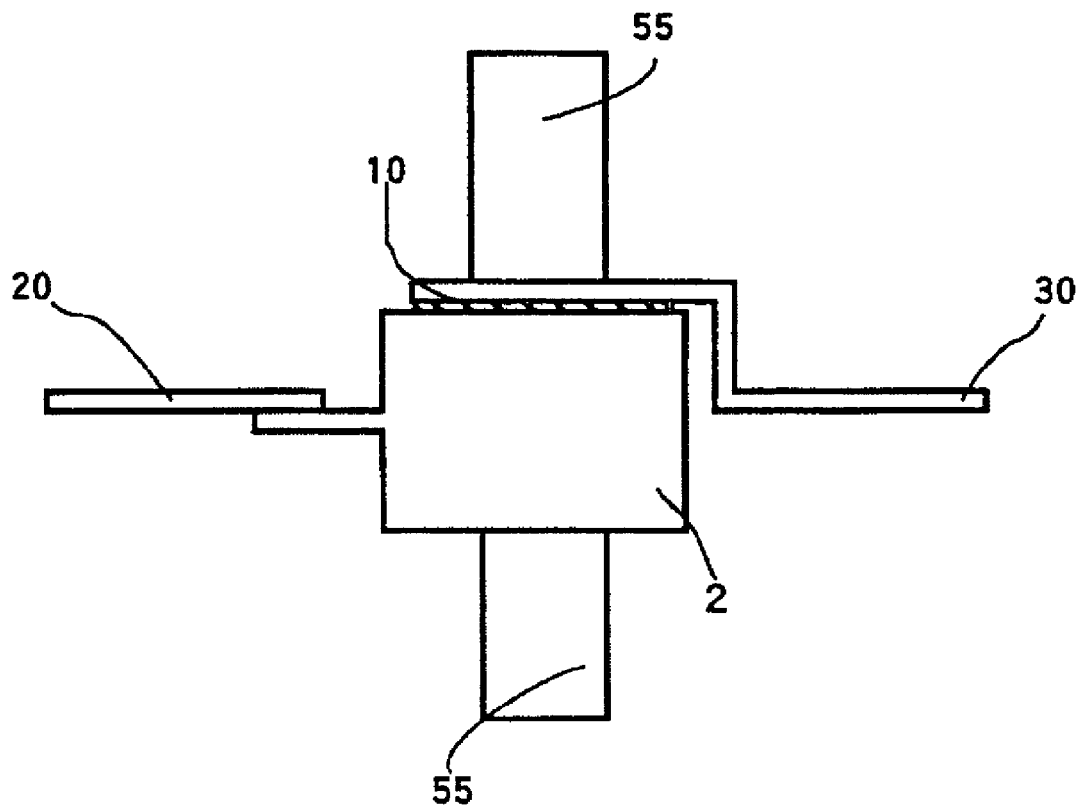
FIG. 4 is an explanatory diagram of a vacuum step in Example 2.
Figure 5:
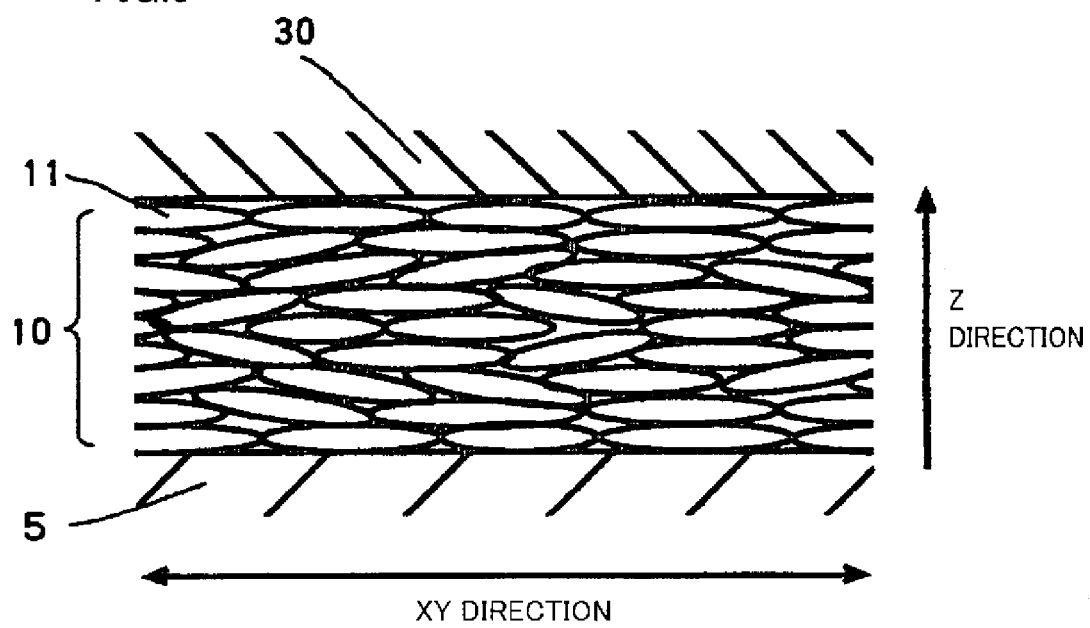
FIG. 5 is a sectional view of a conductive adhesive layer in the prior art.

DESCRIPTION OF THE REFERENCE SIGNS (1) solid electrolytic capacitor
(2) capacitor device
(3) anode body
(3a) anode lead member
(4) dielectric film
(5) cathode layer
(7) housing
(10) conductive adhesive layer
(11) laminar silver particle
(20) anode terminal
(30) cathode terminal
(55) pressing section

The invention claimed is:

1. An electronic part produced by mounting a platy terminal on a device through a conductive adhesive layer,
    wherein said conductive adhesive contains a flat conductive member which is a particle having a discoidal, flaky or laminar shape, and
    wherein said conductive adhesive has a region where said flat conductive member is standing in the direction of thickness of said conductive adhesive layer.

2. An electronic part produced by mounting a platy terminal on a device through a conductive adhesive layer, wherein said conductive adhesive contains a flat conductive member which is a particle having a discoidal, flaky or laminar shape and an organic solvent, and wherein said organic solvent is so vaporized in a vacuum atmosphere that said conductive adhesive has a region where said flat conductive member is standing in the direction of thickness of said conductive adhesive layer.

3. An electronic part produced by mounting a platy terminal on a device through a conductive adhesive layer, wherein said conductive adhesive contains a flat conductive member which is a particle having a discoidal, flaky or laminar shape, and wherein said conductive adhesive includes a portion where the angle formed by said platy terminal and the flat plane of the conductive member is at least 45°.

4. The electronic part according to claim 3, having a portion where said platy terminal and the flat plane of the conductive member are at right angles to each other.

5. The electronic part according to any one of claims 1 to 4, wherein the thickness of said conductive adhesive layer is 0.01 to 0.1 mm.

6. The electronic part according to any one of claims 1 to 4, wherein said electronic part is a solid electrolytic capacitor, and said device is a capacitor device prepared by successively forming a dielectric film and a cathode layer on the surface of an anode body.

7. A process for producing an electronic part, including the step of connecting a platy terminal to a device with a conductive adhesive containing an organic solvent and a conductive member, wherein said step is characterized in vaporizing the organic solvent contained in said conductive adhesive by heating the device mounted with the platy terminal in a vacuum atmosphere.

8. The process for producing an electronic part according to claim 7, wherein said platy terminal connected to the device with the conductive adhesive applies pressure toward the conductive adhesive side with a pressing section in said vacuum atmosphere.

* * * * *